US008804999B2

(12) United States Patent
Ho et al.

(10) Patent No.: US 8,804,999 B2
(45) Date of Patent: Aug. 12, 2014

(54) VIDEO RECOMMENDATION SYSTEM AND METHOD THEREOF

(75) Inventors: Cheng-Yuan Ho, Taipei (TW); I-Heng Meng, Taipei (TW); Chi-Hung Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 57 days.

(21) Appl. No.: 13/494,049

(22) Filed: Jun. 12, 2012

(65) Prior Publication Data

US 2013/0259399 A1 Oct. 3, 2013

(30) Foreign Application Priority Data

Mar. 30, 2012 (TW) .............................. 101111273 A

(51) Int. Cl.
*G06K 9/00* (2006.01)
*G06F 3/00* (2006.01)
*G06F 13/00* (2006.01)
*H04N 5/445* (2011.01)

(52) U.S. Cl.
USPC ............................................ 382/100; 725/46

(58) Field of Classification Search
CPC .......... H04N 21/252; H04N 21/25891; H04N 60/33; H04N 60/465
USPC ......... 382/100, 190, 194, 195; 725/44, 46, 47
See application file for complete search history.

(56) References Cited

U.S. PATENT DOCUMENTS

| 7,716,220 | B2 * | 5/2010 | Michelitsch et al. .......... 707/736 |
| 2007/0022440 | A1 * | 1/2007 | Gutta .............................. 725/46 |
| 2007/0028266 | A1 * | 2/2007 | Trajkovic et al. ............... 725/46 |
| 2009/0007200 | A1 * | 1/2009 | Amento et al. ............... 725/100 |
| 2009/0164904 | A1 * | 6/2009 | Horowitz et al. ............. 715/723 |
| 2010/0071005 | A1 * | 3/2010 | Kusunoki ........................ 725/46 |
| 2010/0149305 | A1 * | 6/2010 | Catchpole et al. .......... 348/14.08 |
| 2010/0199295 | A1 * | 8/2010 | Katpelly et al. ................. 725/14 |
| 2011/0153663 | A1 * | 6/2011 | Koren et al. ................... 707/776 |
| 2012/0143911 | A1 * | 6/2012 | Liebald et al. ................ 707/771 |
| 2012/0148157 | A1 * | 6/2012 | Kumar et al. ................. 382/173 |
| 2012/0209850 | A1 * | 8/2012 | Kikin-Gil et al. ............. 707/738 |
| 2012/0232977 | A1 * | 9/2012 | Calman et al. ............. 705/14.25 |
| 2012/0308195 | A1 * | 12/2012 | Bannan et al. ................ 386/230 |

OTHER PUBLICATIONS

Qin et al. ("A Recommender System for Youtube Based on its Network of Reviewers," IEEE Int'l Conf. on Social Computing/IEEE Int'l Conf. on Privacy, Security, Risk and Trust, Aug. 20-22, 2010, pp. 323-328).*

* cited by examiner

*Primary Examiner* — Yubin Hung
(74) *Attorney, Agent, or Firm* — Birch, Stewart, Kolasch & Birch, LLP

(57) ABSTRACT

A video recommendation system is provided. The video recommendation system has: an interaction device configured to receive feedback information of a video from a user, wherein the videos are composed of a plurality of video segments; a feature calculating module configured to calculate object features of at least a first video segment corresponding to the feedback information in the plurality of video segments; and an analysis module configured to recommend at least one first recommended video segment to the user from the plurality of video segments according to the calculated object features and the feedback information.

14 Claims, 3 Drawing Sheets

VIDEO RECOMMENDATION SYSTEM AND METHOD THEREOF

CROSS REFERENCE TO RELATED APPLICATIONS

This Application claims priority of Taiwan Patent Application No. 101111273, filed on Mar. 30, 2012, the entirety of which is incorporated by reference herein.

BACKGROUND OF THE INVENTION

1. Field of the Invention

The present invention relates to data analysis, and in particular relates to a video recommendation system and method for recommending video segments by analyzing object features in videos.

2. Description of the Related Art

There are many video recommendation systems on the market, which are available on websites such as: Youtube, and Dailymotion, etc. However, the videos are evaluated by using the feedback of users, and thus the video recommendation systems may merely perform statistics and prediction for videos within a large range, and so the contents in the videos cannot be further analyzed. That is, when a user is viewing a video, the conventional video recommendation system cannot analyze the feelings of the user for different circumstances or scenes in the video, and thus the video segments related to the favorite scenes of the user cannot be recommended to users.

BRIEF SUMMARY OF THE INVENTION

A detailed description is given in the following embodiments with reference to the accompanying drawings.

In an exemplary embodiment, a video recommendation system is provided. The video recommendation system comprises: an interaction device configured to receive feedback information of a video from a user, wherein the videos comprise a plurality of video segments; a feature calculating module configured to calculate object features of at least a first video segment corresponding to the feedback information in the plurality of video segments; and an analysis module configured to recommend at least one first recommended video segment to the user from the plurality of video segments according to the calculated object features and the feedback information.

In another exemplary embodiment, a video recommendation method applied in a video recommendation system is provided. The method comprises the following steps of: receiving feedback information of a video from a user, wherein the video comprises a plurality of video segments; calculating object features of at least a first video segment corresponding to the feedback information in the plurality of video segments; and recommending at least one first recommended video segment to the user from the plurality of video segments according to the calculated object features and the feedback information.

In yet another exemplary embodiment, a video recommendation system is provided. The video recommendation system comprises: an interaction device configured to receive feedback information of videos from multiple users, wherein the videos comprise a plurality of video segments; a feature calculating module configured to calculate at least one object feature of the plurality of video segments corresponding to the feedback information; and an analysis module configured to calculate the popularity of the at least one object feature of the plurality of video segments, and recommend at least one recommended video segment from the plurality of video segments according to the popularity of the at least one object feature.

In yet another exemplary embodiment, a video recommendation method applied in a video recommendation system is provided. The method comprises the following steps of: receiving feedback information of videos from multiple users, wherein the videos comprise a plurality of video segments; calculating at least one object feature of the plurality of video segments corresponding to the feedback information; calculating the popularity of the at least one object feature of the plurality of video segments; and recommending at least one recommended video segment from the plurality of video segments according to the popularity of the at least one object feature.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
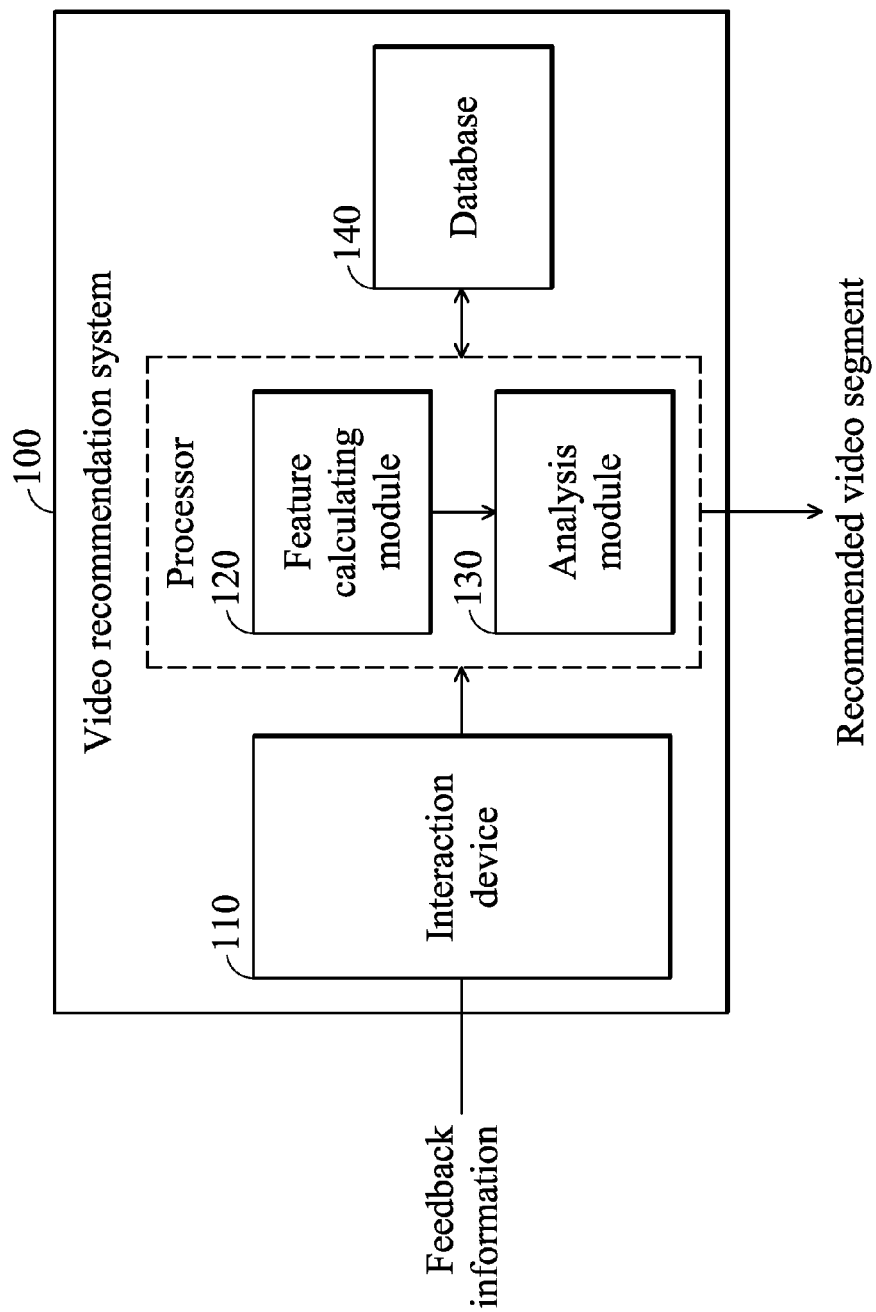
FIG. 1 illustrates a block diagram of the video recommendation system according to an embodiment of the invention.

FIG. 1 illustrates a block diagram of the video recommendation system according to an embodiment of the invention. In an embodiment, the video recommendation system may comprise an interaction device 110, a feature calculating module 120, an analysis module 130 and a database 140. When a user is viewing a video (e.g. streaming video), the interaction device 110 is configured to be input with the feedback for viewing the video by the user, thereby generating feedback information, wherein the video may comprise a plurality of video segments. The feature calculating module 120 is configured to analyze the video viewed by the user by calculating the object features of the video segments in the video corresponding to the feedback information. The object features calculated by the feature calculating module 120 may comprise high level features and low level features of the video. For example, shot classification, semantic concept detection, and extended applications can be regarded as the high level features of the video segments. The features of the video segments such as the color histogram, the color distribution, edge statistics, and textures can be regarded as low level features. Briefly, the high level features are object characteristics close to explanation by human, and the low level features are close to the substantial properties of objects. The difference between the low level features and high level features can be regarded as a "semantic gap". Further, the feature calculating module 120 can be further configured to receive the feedback information of the user from the interaction device 110, label the feedback information (e.g. like or dislike) to the corresponding video segments of the video, and store the labeled video back to the database 140, where the details will be described later. It should be noted that, the videos stored in the database 140 are usually video compression files, such as MPEG2, and H.264 video compression files. Thus, after labeling the feedback information to a portion of video segments, the whole video corresponding to the labeled video segments are stored back to the database 140. Alternatively, the feature calculating module 120 may merely store the video segments labeled with the feedback information back to the database 140.

The analysis module 130 is configured to analyze the hobby for viewing videos of the user according to the feedback information of the user, and recommend a video or recommend video segments which match the user's most preferred scenes from the plurality of videos stored in the database 140 or recommend a recommended video segment from a video to the user. The database 140 is configured to store a plurality of videos and corresponding object features, wherein the videos stored in the database 140 may comprise the videos labeled with the feedback information or the videos not labeled yet.

Specifically, the analysis module 130 may retrieve the feedback information of the user from the database 140 or from the interaction device 110 directly, analyze the feedback information of the user to obtain the user information such as favorite video types, scene classifications, semantic concepts or extended applications, and store the user information to the database 140, where the aforementioned procedure can be regarded as a training phase. When the user uses the video recommendation system 100 to view a video again, the analysis module 130 may retrieve the corresponding user information from the database 140 immediately, and recommended the likely favorite video segments to the user, thereby significantly reducing the time spent on recommending the video segment.

It should be noted that the interaction device 110 may further receive and integrate feedback information about different videos from multiple users, and the analysis module 130 may recommend videos or video segments to the user according to the integrated feedback information. For example, in an embodiment, the analysis module 130 may calculate the popularity of each video and each video segment stored in the database 140 according to the feedback information from multiple users, and recommend at least one video or at least one recommended video segment to the user from the videos and video segments according to the popularity of each video and video segments.

In another embodiment, the interaction device 110 may further receive and integrate feedback information of different videos from multiple users, wherein the videos comprise a plurality of video segments. The feature calculating module 120 may calculate at least one object feature of the video segments corresponding to the integrated feedback information. The analysis module 130 may calculate the popularity of the object features or the videos and/or video segments corresponding to the integrated feedback information, and recommend at least one recommendation video or at least one recommended video segment to the user according to the calculated popularity. For example, the analysis module 130 may know that multiple users like to view the video segments of homeruns according to the feedback information from the multiple users, wherein the video segments of homeruns may indicate a corresponding high level object feature. When a user is viewing a video A (e.g. a baseball game), the analysis module 130 may further recommend video segments of homeruns to the user from the video A or other videos, but the invention is not limited thereto.

In another embodiment, the feature calculating module 120 may use local binary patterns, color histograms, Haar-like features, and directional edge maps to calculate the low level features of each video such as colors, edges, corners, shapes, and textures. The feature calculating module 120 may also use a speech-based detection method to analyze the low level features of the video such as the volume, the pitch, or the timbre. In yet another embodiment, the feature calculating unit 120 may further use the support vector machine (SVM), the neural network, or the Adaboost algorithm to calculate the high level features of each video and video segments, such as the face, object, scene, and semantic concept. The feature calculating module 120 may further analyze the acoustic high level features, such as keywords, and rhythms.

Further, the feature calculating module 120 may analyze the high level features of the video by using the calculated low level features of the video. For example, in the analysis of the video of a baseball game, the feature calculating unit 120 may use the colors and edge information to perform scene classification and detect the ball trajectory and motions of people, thereby analyzing the baseball game is in play or suspended. In addition, the feature calculating module 120 may use the captions or specific pictures (e.g. the thumbnail of the baseball park or the profile of the baseball game) within the video, and keyword phrases or speeches to analyze different concepts within the video of the baseball game, such as a single, a double, a triple, a homerun, a stolen base, caught stealing, fly out, strikeout, base on ball, sacrifice bunt, sacrifice fly, double play, and triple play, but the invention is not limited thereto.

In an embodiment, the analysis module 130 may recommend videos to a single user. For example, the analysis module 130 may use a collaborative filtering algorithm, a content-base filtering algorithm, or a hybrid-based filtering algorithm, load the corresponding object features of the videos labeled by the user, search for the object feature labeled most often by the user, and retrieve the videos or video segments corresponding to the object feature most preferred by the user from the database 140. In other words, the collaborative filtering algorithm used in the analysis module 130 may build connections between each object feature and the user information, and determine the similarity (e.g. an evaluation score) of each connection. Then, the analysis module 130 may retrieve the connection with the highest similarity and recommend the video segment corresponding to the connection with the highest similarity to the user. It should be noted that, there may be recommended video segments with equal evaluation scores among the huge amount of video segments, and the analysis module 130 may select the video segment most preferred by the user according to the preference of the user (e.g. a user setting), and recommend the selected video segment to the user.

In an embodiment, when the user is viewing a video on the video recommendation system 100, the user may send his/her feedback information to the feature calculating module 120 through the interaction device 110, wherein the feedback information may comprise time information. In other words, when the feature calculating module 120 receives the feedback information from the interaction device 110, the feature calculating module 120 may know the video segments in the video corresponding to the feedback information simultaneously. For example, if the video is divided into a plurality of video segments according to a fixed time interval (e.g. 1 minute), the aforementioned video segment can be a video segment at where the time information is located (i.e. the video segment has a fixed length), or a video segment within 30 seconds before/after the time information (total 1 minute)

(i.e. retrieving the video segment with a fixed length dynamically), or a video segment corresponding to a scene (i.e. the length of the video segment is not fixed), but the invention is not limited thereto. For example, the analysis module 130 may recommend spectacular video segments from a single video. Specifically, the analysis module 130 may retrieve all labels (feedback information) and object features of each video segment of the video, search for the classifications of each label, and filter the video segments corresponding to the classifications. It should be noted that, the video recommendation system 100 of the invention may be applied to a conventional video database. That is, the feature calculating module 120 may further label and analyze the object features of video segments of each video in the video and database, and the analysis module 130 may recommend favorite video segments of a user from a plurality of video videos or recommend spectacular video segments from a video according to the labels and the object features of each video and each video segment.

It should be noted that, the feedback information labeled on the video segments by the feature calculating module 120 can be recorded in the form of data columns, and it can be labeled in the corresponding video segments in the form of tags. In addition, the interaction device 110 can be generally regarded as a client device at the places where the user views videos. The invention is not limited to a single interaction device 110, and the interaction devices 110 can be placed to locations of multiple users separately. Thus, the analysis module 130 may receive and integrate the feedback information from the multiple users. Also, the feature calculating module 120 and the analysis module 130 can be disposed in a remote server. Every time when a new video is added to the database 140, the feature calculating module 120 and the analysis module 130 may calculate the object features (including high level features and low level features) of the new video (and/or the video segments thereof), label the calculated object features on the new video (and/or the video segments thereof), and store the labeled new video to the database 140.

Figure 2:
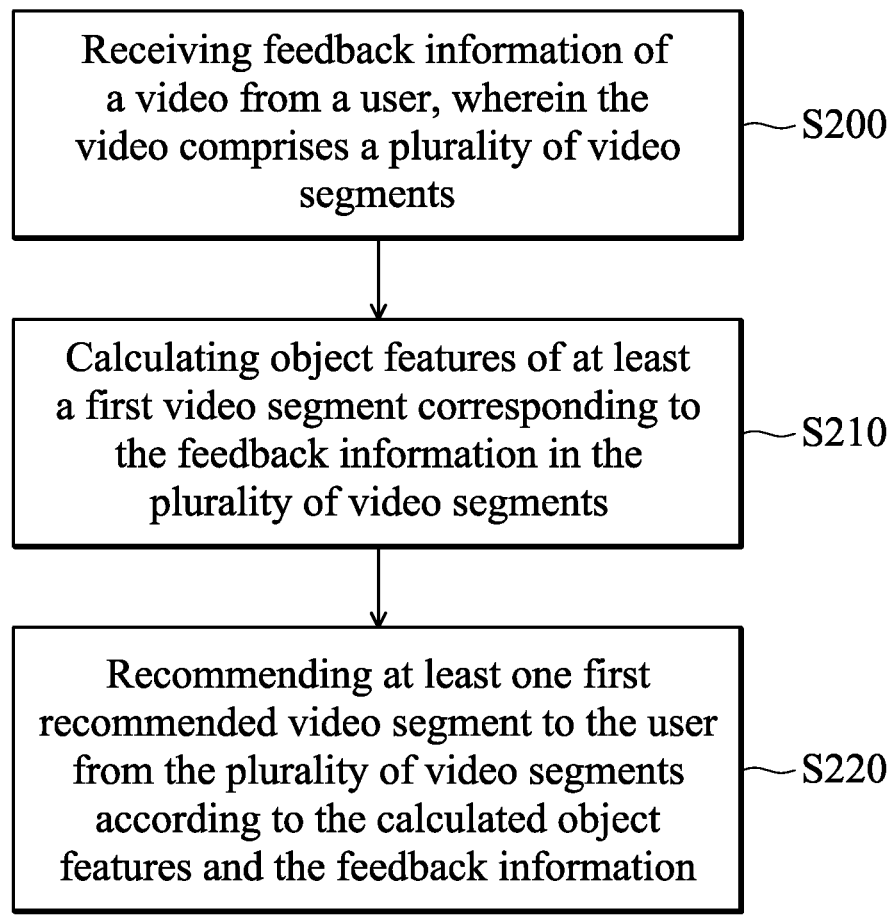
FIG. 2 illustrates a flow chart of the video recommendation method according to an embodiment of the invention.

FIG. 2 illustrates a flow chart of the video recommendation method according to an embodiment of the invention. In step S200, the interaction device 110 may receive feedback information of a video from a user, wherein the video comprises a plurality of video segments. In step S210, the feature calculating module 120 may calculate object features (i.e. including high level features and low level features) of a first video segment corresponding to the feedback information in the plurality of video segments. In step S220, the analysis module 130 may recommend at least one recommended video segment to the user from the plurality of video segments according to the calculated object features and the feedback information.

Figure 3:
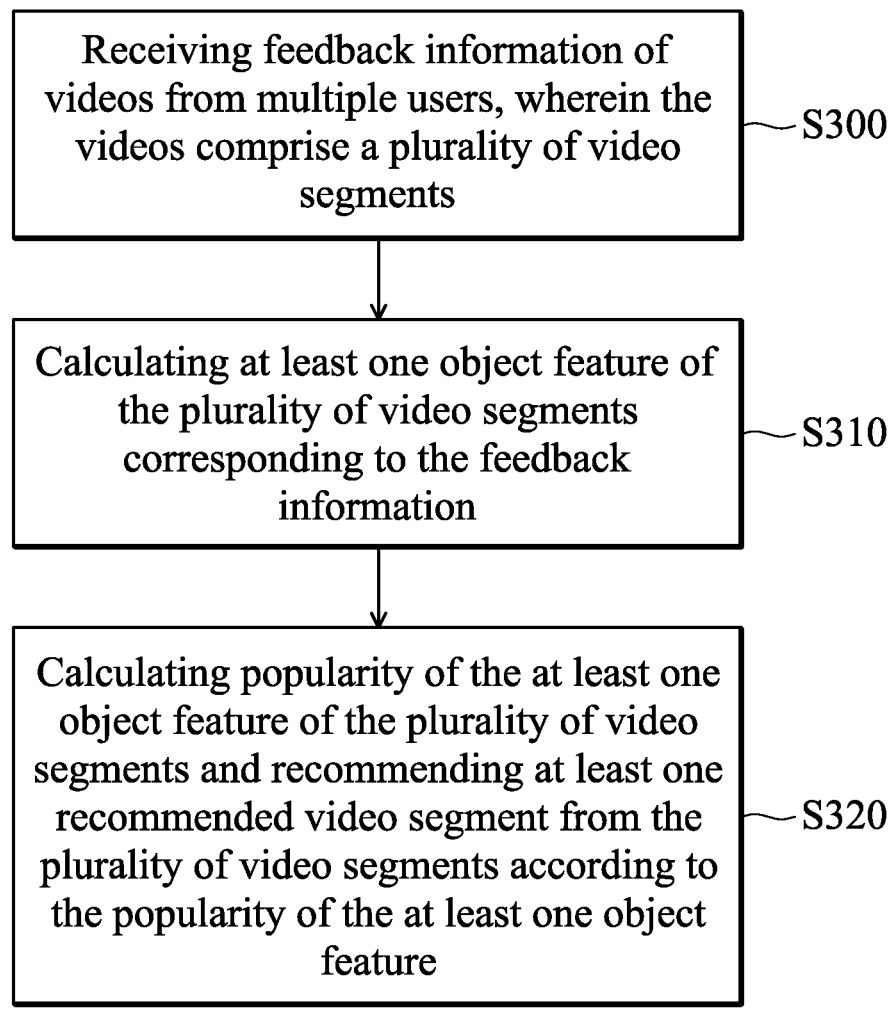
FIG. 3 illustrates a flow chart of the video recommendation method according to another embodiment of the invention.

FIG. 3 illustrates a flow chart of the video recommendation method according to another embodiment of the invention. In step S300, the interaction device 110 may receive feedback information of a plurality of videos from multiple users, wherein the plurality of videos comprise a plurality of video segments. In step S310, the feature calculating unit 120 may calculate at least one object feature of the plurality of video segments corresponding to the feedback information. In step S320, the analysis module 130 may calculate the popularity of the at least one object feature of the plurality of video segments, and recommend at least one recommended video segment from the plurality of video segments according to the popularity of the at least one object feature. It should be noted that, the procedure of FIG. 2 corresponds to recommending at least one video segment to a single user according to the feedback information of the single user, and it indicates that the video recommendation method of FIG. 2 corresponds to the feedback of a single user. However, the procedure of FIG. 3 corresponds to recommending at least one video or at least one video segment according to feedback information of different videos from multiple users, and it indicates that the video recommendation method in FIG. 3 corresponds to the feedback of multiple users.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video recommendation method applied in a video recommendation system, the method comprising:
    receiving feedback information of a video from a user, wherein the video comprises a plurality of video segments, and each video segment comprises a plurality of frames;
    calculating object features of at least a first video segment corresponding to the feedback information in the plurality of video segments, wherein the object features comprise at least one high level feature and at least one low level feature of the at least one first video segment, and the high level feature indicates object characteristics of the video segments or the frames close to explanation by human, and the low level features are close to the substantial properties of objects of each frame;
    calculating popularity of the object features of the video segments according to the high level features and the low level features; and
    recommending at least one first recommended video segment to the user from the plurality of video segments according to the calculated popularity of the object features and the feedback information.

2. The video recommendation method as claimed in claim 1, wherein the feedback information comprises at least one time information, and the method further comprises:
    retrieving the at least one first video segment from the plurality of video segments according to the at least one time information;
    labeling the feedback information to the at least one first video segment; and
    storing the plurality of video segments to a database.

3. The video recommendation method as claimed in claim 2, wherein the database stores a plurality of second videos comprising a plurality of second video segments, second object features corresponding to the plurality of second video segments, and second user information, and the method further comprises:

recommending a second recommended video segment to the user from the plurality of second video segments according to the second object features and the second user information.

4. The video recommendation method as claimed in claim 1, wherein the at least one high level feature comprises a face, an object, a scene, and/or a semantic concept of the at least one first video segment.

5. The video recommendation method as claimed in claim 1, wherein the at least one low level feature comprises a color histogram, color distribution, edge statistics, and/or a texture corresponding to the at least one first video segment.

6. The video recommendation method as claimed in claim 1, further comprising:

analyzing the feedback information to retrieve user information of the user; and recommending at least one third recommended video segment to the user according to the user information.

7. A video recommendation method applied in a video recommendation system, the method comprising:

receiving feedback information of videos from multiple users, wherein the videos comprise a plurality of video segments, and each video segment comprises a plurality of frames;

calculating at least one object feature of the plurality of video segments corresponding to the feedback information;

calculating the popularity of the at least one object feature of the plurality of video segments; and recommending at least one recommended video segment from the plurality of video segments according to the popularity of the at least one object feature, wherein the at least one object feature comprises at least one high level feature and at least one low level feature of the plurality of video segments, and wherein the high level feature indicates object characteristics of the video segments or the frames close to explanation by human, and the low level features are close to the substantial properties of objects.

8. A video recommendation system, comprising:

an interaction device configured to receive feedback information of a video from a user, wherein the video comprises a plurality of video segments, and each video segment comprises a plurality of frames;

a feature calculating module, implemented by a processor, configured to calculate object features of at least a first video segment corresponding to the feedback information in the plurality of video segments, wherein the object features comprise at least one high level feature and at least one low level feature of the at least one first video segment, and the high level feature indicates object characteristics of the video segments or the frames close to explanation by human, and the low level features are close to the substantial properties of objects of each frame; and an analysis module, implemented by the processor, configured to calculate popularity of the object features of the video segments according to the high level features and low level features and recommend at least one first recommended video segment to the user from the plurality of video segments according to the calculated popularity of the object features and the feedback information.

9. The video recommendation system as claimed in claim 8, wherein the feedback information comprises at least one time information, and the feature calculating module further retrieves the at least one first video segment from the plurality of video segments according to the at least one time information, labels the feedback information to the at least one first video segment, and stores the plurality of video segments to a database.

10. The video recommendation system as claimed in claim 9, wherein the database stores a plurality of second videos comprising a plurality of second video segments, second object features corresponding to the plurality of second video segments, and second user information, and the analysis module further recommends a second recommended video segment to the user from the plurality of second video segments according to the second object features and the second user information.

11. The video recommendation system as claimed in claim 8, wherein the at least one high level feature comprises a face, an object, a scene, and/or a semantic concept of the at least one first video segment.

12. The video recommendation system as claimed in claim 8, wherein the at least one low level feature comprises a color histogram, color distribution, edge statistics, and/or a texture corresponding to the at least one first video segment.

13. The video recommendation system as claimed in claim 8, wherein the analysis module further analyzes the feedback information to retrieve user information of the user, and recommends at least one third recommended video segment to the user from the plurality of video segments according to the retrieved user information.

14. A video recommendation system, comprising:

an interaction device configured to receive feedback information of videos from multiple users, wherein the videos comprise a plurality of video segments, and each video segment comprises a plurality of frames;

a feature calculating module, implemented by a processor, configured to calculate at least one object feature of the plurality of video segments corresponding to the feedback information; and an analysis module, implemented by the processor, configured to calculate popularity of the at least one object feature of the plurality of video segments according to the high level features and the low level features, and recommend at least one recommended video segment from the plurality of video segments according to the popularity of the at least one object feature, wherein the at least one object feature comprises at least one high level feature and at least one low level feature of the plurality of video segments, and wherein the high level feature indicates object characteristics of the video segments or the frames close to explanation by human, and the low level features are close to the substantial properties of objects.

* * * * *